(12) United States Patent
Sturm et al.

(10) Patent No.: US 12,061,300 B2
(45) Date of Patent: Aug. 13, 2024

(54) METHOD FOR OPERATING A RADIATION DETECTOR AND RADIATION DETECTOR

(71) Applicant: Siemens Healthineers AG, Forchheim (DE)

(72) Inventors: Leander Sturm, Mistelgau (DE); Alfons Eismann, Pinzberg (DE)

(73) Assignee: Siemens Healthineers AG, Forchheim (DE)

( * ) Notice: Subject to any disclaimer, the term of this patent is extended or adjusted under 35 U.S.C. 154(b) by 357 days.

(21) Appl. No.: 17/542,980

(22) Filed: Dec. 6, 2021

(65) Prior Publication Data

US 2022/0179108 A1 Jun. 9, 2022

(30) Foreign Application Priority Data

Dec. 8, 2020 (EP) .................................... 20212462

(51) Int. Cl.
*G01T 1/24* (2006.01)

(52) U.S. Cl.
CPC .................................... *G01T 1/244* (2013.01)

(58) Field of Classification Search
CPC .. G01T 1/244; G01T 1/24; A61B 6/42; A61B 6/585
See application file for complete search history.

(56) References Cited

U.S. PATENT DOCUMENTS

| | | | | |
|---|---|---|---|---|
| 10,120,082 B2* | 11/2018 | Ergler | ........................ | G01T 1/18 |
| 10,324,201 B2* | 6/2019 | Groepl | ................. | H03M 1/662 |
| 10,330,800 B2* | 6/2019 | Chaudhury | ............. | G01T 1/247 |
| 10,408,672 B2* | 9/2019 | Rutter | ........................ | G01J 1/08 |
| 11,071,514 B2* | 7/2021 | Mollov | ................... | A61B 6/482 |
| 2015/0362604 A1* | 12/2015 | Verbakel | ................ | G01N 23/02 250/336.1 |
| 2016/0220222 A1* | 8/2016 | Schroeter | ............... | A61B 6/585 |
| 2017/0010366 A1* | 1/2017 | Schroeter | ................ | G01T 1/208 |
| 2018/0259658 A1* | 9/2018 | Chaudhury | .............. | G01T 1/24 |
| 2018/0284303 A1* | 10/2018 | Steadman Booker | .. | G01T 1/247 |
| 2022/0179108 A1* | 6/2022 | Sturm | ..................... | G01T 1/244 |
| 2022/0350027 A1* | 11/2022 | Nishino | ............... | H01L 31/107 |

FOREIGN PATENT DOCUMENTS

| | | |
|---|---|---|
| DE | 102015201494 A1 | 8/2016 |
| WO | WO 2014132232 A2 | 9/2014 |

OTHER PUBLICATIONS

Dedic V. et al: "De-polarization of a CdZnTe radiation detector by pulsed infrared light"; Applied Physics Letters; A I P Publishing LLC; US; Bd. 107; Nr. 3; Jul. 20, 2015; XP012199066; ISSN: 0003-6951; DOI: 10.1063/1.4927382.
European Search Report for European Patent Application No. 20212462 dated May 6, 2021.

* cited by examiner

*Primary Examiner* — David P Porta
*Assistant Examiner* — Gisselle M Gutierrez
(74) *Attorney, Agent, or Firm* — Harness, Dickey & Pierce, P.L.C.

(57) ABSTRACT

A method is for operating a radiation detector, in particular an X-ray radiation detector. The radiation detector has a control device to generate a control signal for an illumination unit. The control signal is generated via a pulse current source and a DC source. The pulse current source generates a pulsed signal portion and the DC source generates a direct component. The pulsed signal portion and the direct component are superimposed to generate the control signal and are fed to the illumination unit. A radiation detector is furthermore specified.

27 Claims, 1 Drawing Sheet

METHOD FOR OPERATING A RADIATION DETECTOR AND RADIATION DETECTOR

PRIORITY STATEMENT

The present application hereby claims priority under 35 U.S.C. § 119 to European patent application number EP20212462.4 filed Dec. 8, 2020, the entire contents of which are hereby incorporated herein by reference.

FIELD

Example embodiments of the invention generally relate to a method for operating a radiation detector; and a radiation detector.

BACKGROUND

Imaging devices in medical diagnostics, for example X-ray devices, typically have a radiation detector, in particular X-ray radiation detectors, X-ray detectors for short.

X-ray detectors are normally embodied as scintillator detectors or as detectors with a direct converter.

Scintillator detectors have a scintillator material. Scintillator materials are excited by irradiation with X-ray radiation and emit the excitation energy in the form of light. The emitted light is then converted into an electrical signal, for example via photodiodes, and is evaluated in an evaluation unit. Scintillator detectors frequently have multiple scintillator elements which are arranged in the manner of an array. Similarly, the photodiodes are likewise arranged in the manner of an array.

Detectors with direct converters normally have a semiconductor material, for example a semiconductor based on cadmium and tellurium, which converts radiation incident upon it, for example X-ray radiation, into an electrical signal.

The way in which a direct converter detector works can be described in a greatly simplified manner as follows: the X-ray radiation incident upon the semiconductor generates charge carriers within the semiconductor in the form of electron hole pairs. A voltage, known as the bias voltage, is applied to the semiconductor during operation. This generates an electrical field (E-field) in the semiconductor. The electron hole pairs experience a force as a result of the E-field, are separated from one another and move in the direction of electrical contact elements which in each case are arranged on an upper side of the semiconductor element and on an underside of the semiconductor for the application of the bias voltage. A charge pulse arising as a result of this is then detected via a recording unit and evaluated. A precise description of how a direct converter detector works can be found for example in DE 2015 201 494 A1.

During irradiation by X-ray radiation, in particular in the case of a high intensity of the X-ray radiation, direct-converting detectors frequently exhibit a polarization. The polarization describes an undesired change in the E-field within the semiconductor material of the detector. The polarization thus acts directly on the detector properties, for example the charge carrier transport property of the semiconductor material.

The polarization is frequently a consequence of defects, for example in the form of empty spaces which occur during the manufacture of the semiconductor. Furthermore, the polarization has a dependency in respect of the temperature of the semiconductor material and/or of the effective radiation. In other words: the polarization effects of a direct-converting detector are firstly of a production-related nature and secondly of an operation-related nature. The latter results in an operation-related and thus time-related dependency of the polarization effects, meaning that the polarization status of a detector changes over time, for example a detector has a different polarization status prior to a treatment than after a treatment.

In particular, the signal characteristic of a received measurement signal is changed by the polarization. For example, the intensity of the measurement signal changes with time while radiation intensity or radiation dose remain the same. This effect is also called signal drift and has a negative effect on the functional capability of the detector.

DE 10 2015 201 494 A1 specifies a method for determining a polarization status of an X-ray detector, referred to below as a detector, in order to reduce the signal drift.

In this case the detector is illuminated with a light pulse sequence. The individual light pulses each have different intensities. Furthermore, an intensity of the light pulses is determined, in which a charge pulse generated by the detector exceeds a preset threshold voltage. The threshold voltage is set for example via a signal detection unit. In other words: a relationship is created between an illumination intensity and the determined exceeded threshold voltage. This relationship varies depending on the polarization status of the detector, as a result of which a determination of the polarization status of the detector can take place. In consequence, the detector can be set to the signal drift by suitable measures, such as for example a calibration, i.e. the detector is set such that the shift in the measurement signal is reduced and/or offset.

SUMMARY

The inventors have discovered that specific requirements arise for controlling the LEDs, for example in respect of switching times of the components employed for the control. To satisfy these requirements, complex and expensive components have been employed.

Based hereon, at least one embodiment of the invention is to enable the reliable operation of a radiation detector with a simple structure At least one embodiment is directed to a method for operating a radiation detector. At least one embodiment is further directed to a radiation detector. Advantageous embodiments, variants and developments form the subject matter of the claims.

At least one embodiment is directed to a method for operating a radiation detector, upon being illuminated with light via an illumination unit, the illumination unit being controllable via a control device including a DC source and a pulse current source, the method comprising:
  controlling the illumination unit by a control signal including a pulsed signal component and a direct component.

At least one embodiment is directed to a radiation detector comprising:
  a control device to control an illumination unit, the control device including
    a pulse current source, and
    a DC source, the pulse current source and the DC source being designed to control the illumination unit via a control signal including a pulsed signal component.

BRIEF DESCRIPTION OF THE DRAWINGS

The advantages and preferred embodiments explained in respect of the method can be analogously transferred to the device and vice versa.

Example embodiments of the invention are explained in greater detail below on the basis of the figures. These show, in part in greatly simplified representations.

In the figures, parts having the same effect are represented with the same reference characters.

DETAILED DESCRIPTION OF THE EXAMPLE EMBODIMENTS

Figure 1:
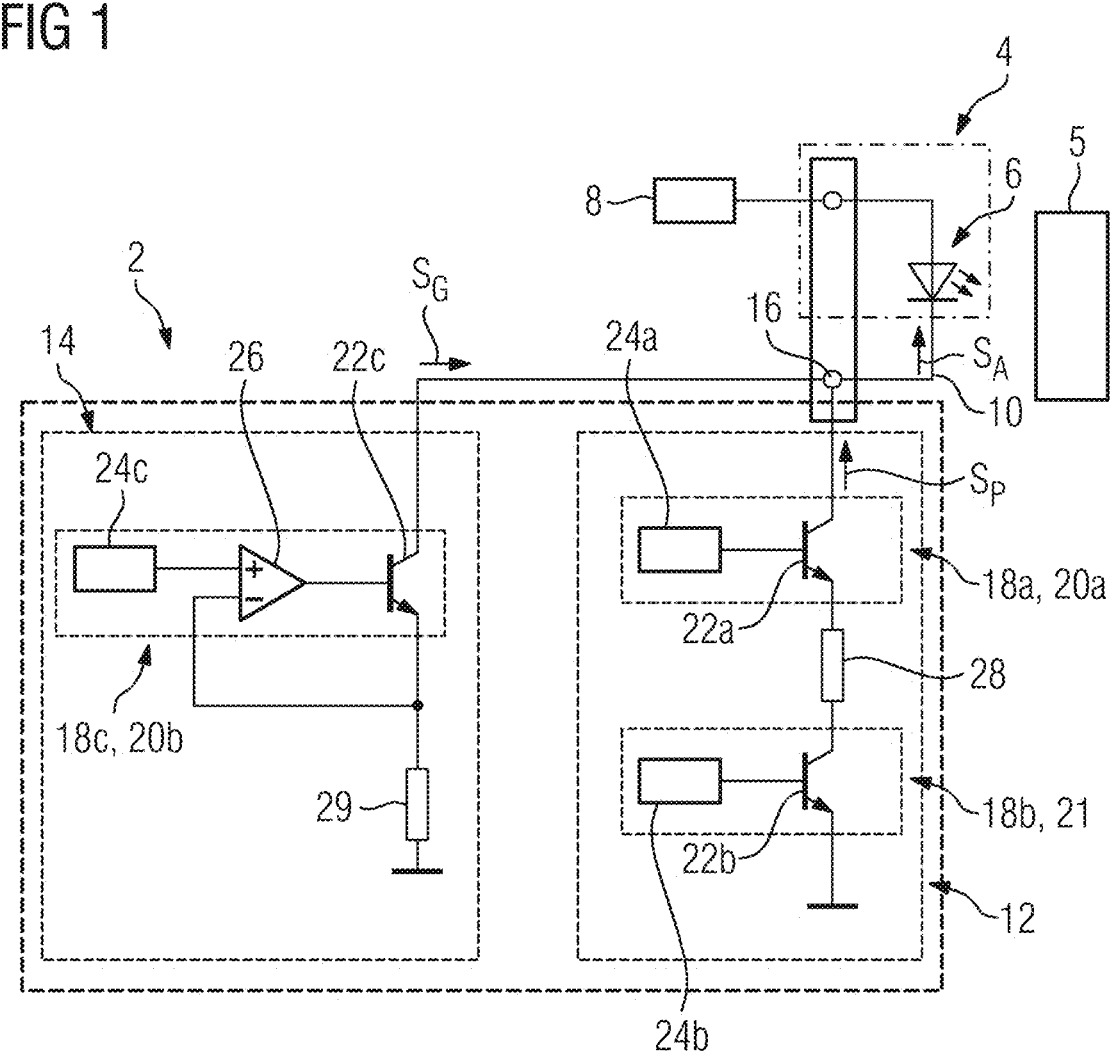
FIG. 1 shows a circuit diagram of an illumination unit and of a control device connected to the illumination unit of an embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description.

However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In at least one embodiment, the radiation detector is illuminated with light during operation via an illumination unit, in particular an LED unit, to determine a polarization. This serves for the defined setting of the radiation detector, as is known for example from DE 10 2015 201 494 A1, the entire contents of which are hereby incorporated herein by reference.

In at least one embodiment, the radiation detector is in particular an X-ray radiation detector, preferably a direct-converting detector, as previously described.

In at least one embodiment, the illumination unit has a control device. The LEDs are controlled by a control signal, which is generated with the help of the control device. The control signal is expediently formed from a superimposition of two signal portions, meaning that the signal has a pulsed signal portion and a direct component optionally superimposed over the pulsed signal portion. "Optionally" here means that the LEDs can likewise be controlled in operation merely with the pulsed signal portion. This is because the control device has a DC source and a pulse current source.

In at least one embodiment, the pulsed signal component is analogously generated by the pulse current source and the direct component by the DC source. Thus both the signal portions are initially generated separately from one another. The pulsed signal component and the direct component are then superimposed and fed to the LEDs. The control signal is analogously an electrical current which is conducted through the LEDs. The electrical current, referred to as the LED current below, stands in direct correlation with the intensity of the LEDs. For example, if the value of the LED current increases, the value of the intensity of the LEDs also increases.

In at least one embodiment, for the superimposition of a pulsed signal portion and a direct component the value of the direct component is added to all values of the pulsed signal. In other words: when viewed in a Cartesian coordinate system the direct component "shifts" the pulsed signal component along the ordinate axis by the value of the direct component.

Because the LEDs and thus the semiconductor material of the radiation detector are acted upon via the direct component of the control signal, a short-term drift reduction of the electron hole pairs is achieved. This means that the signal stability remains constant over time, since the radiation detector has a lower signal drift than if the semiconductor material is not acted upon by the direct component of the control signal. The advantage is that the image quality is increased.

In at least one embodiment, by way of the pulsed signal portion a short-term electron transport of the electron hole pairs is generated within the semiconductor material of the radiation detector during a first measurement. The electron transports generate the charge pulses already described in the introduction within the semiconductor material. The charge pulses generate counting events within a signal detection unit known from DE 10 2015 201 494 A1, for example an application-specific integrated circuit (ASIC), which are detected and stored via the ASIC. After a defined number of operating hours, preferably within one day, for example after 3 hours, the radiation detector is once again acted upon by the pulsed signal portion during a second measurement and the charge pulses are detected and the counting events are detected and stored. The counting events detected and stored during the second measurement are then compared with the counting events of the first measurement. A deviation in the two counting events is then used as a correction value for measured signals during operation of the radiation detector via X-ray radiation. The advantage of this is that the signal drift of the radiation detector, in particular the long-term drift, is improved and/or prevented.

The pulsed signal portion also has for its amplitude an in particular periodic pulse pattern, preferably a square-wave signal, which are both set via the pulse current source. "Periodic pulse pattern" here means that a signal pulse, preferably a square-wave pulse, is repeated at unvarying, recurring intervals of time.

To this end the pulse current source has, in accordance with a first embodiment, a first switching element, preferably an electronic load, for setting the amplitude and thus the pulse height of the pulsed signal. The pulse current source further has a second switching element, preferably a switch, serially following on from the first switching element, via which the pulse pattern of the pulsed signal portion is set.

This embodiment is based on the consideration of "distributing" the generation of the pulsed signal portion to two switching elements to permit a simple and inexpensive generation of the pulsed signal portion. To set the pulse height of the pulsed signal portion the first switching element has commercially available switches, preferably transistors. The second switching element likewise has commercially available switches, in particular transistors. The difference between the switches of the first switching element and the switches of the second switching element can be seen in the switching time of the switches. In other words: the switches of the first switching elements have, from the circuitry perspective, a slower switching time than the switches of the second switching element via which the pulse pattern of the pulsed signal portion is set. Thus only a "fast-switching" component is required for the generation of the pulsed signal portion.

In at least one embodiment, to generate the pulsed signal portion a current is first set with an amplitude via the first switching element, and then flows through the second switching element, in order for example thanks to repeated switching off and on again of the second switching element to be formed there into a square-wave signal with a defined edge steepness and a defined pulse width. "Edge steepness" here means a time period that the control signal needs in order to reach the full value of the amplitude. For example, if the control signal has an edge steepness of 10 ns and an amplitude of 100 mA, the value of the control signal rises after switch-on to the value of 100 mA within 10 ns.

"Pulse width" in this case means the time period in which for example a square-wave signal has the full amplitude before the signal decreases again. For example, if a square-wave signal has a pulse width of 200 ns and an amplitude of 150 mA, the value of the square-wave signal stays constant after rising to the amplitude of 150 mA for 200 ns before it for example decreases again to the value of 0 A. The pulse width thus forms the "width" of the square of the square-wave signal.

In at least one embodiment, the pulsed signal portion of the control device preferably comprises a sequence of individual pulses, the amplitude of which increases. In other words: a signal is generated as a pulsed signal portion and comprises a sequence of individual pulses. Each individual pulse has an amplitude (pulse height). The pulsed signal portion is preferably set such that the amplitude of the individual pulses is kept constant over an interval of time, for example in the range between 1 µs and 5 µs. The subsequent pulse sequence then has a higher amplitude. Thanks to this configuration the increase in the amplitude of the individual pulses takes place in a step-shaped manner. Alternatively, each individual pulse has a higher amplitude than the preceding individual pulse, resulting in a ramp-shaped increase in the amplitude of the individual pulses.

The values of the charge pulses are, as described in the introduction, preferably raised in terms of circuitry until they exceed a value of a preset threshold voltage of a signal detection unit. "Exceed" here means that the value of the charge pulses has at least the value of the preset threshold voltage, and preferably has a larger value than the value of the threshold voltage.

According to a particularly preferred embodiment, regulation of an absolute amplitude accuracy of the pulsed signal portion is dispensed with. This embodiment is based on the following idea: in order to take account of a calibration and thus a reduction in the signal drift, a comparison of the counting events determined by at least two measurements is relevant, as already described. In this case it is preferable to detect the relative amplitude change in the pulsed signal portion, in particular in respect of the ampere value, in respect of a calibration of the radiation detector than to detect the absolute amplitude change.

In other words: if for example a difference in the counting events in respect of the amplitude of the control signal has a value of 20 mA, the 20 mA are necessary for a calibration as a relative difference between both the measurements. Whether the determined difference of 20 mA occurs because of an amplitude difference from 100 mA to 120 mA or because of an amplitude difference from 60 mA to 80 mA is a secondary consideration in respect of the method for reducing the signal drift.

However, in the case of the at least two measurements the pulse sequence expediently has an identical ramp shape and an identical starting value. The amplitude of the ramp shape is preferably a value in the region of a few hundred milliamperes.

In at least one embodiment, the DC source expediently has a third switching element, preferably an electronic load, via which the height of the direct component is set.

This embodiment has the advantage that the direct component can more easily be switched to or away from the pulsed signal portion because the direct component is set via a separate switching element. Furthermore, this embodiment has advantages in respect of costs and the complexity of circuitry. Conventional and above all inexpensive components can be used for implementation.

According to a preferred development the illumination unit, in particular the LEDs, is acted upon by the direct component for the entire duration of the control. For the entire duration of the control the semiconductor material of the radiation detector is thus illuminated with a permanent light. The direct component is connected to the pulsed signal portion in order to condition the semiconductor material. As a result, a more accurate determination of the polarization is enabled.

The individual pulses set preferably have an edge steepness with a value in the range between 10 ns and 15 ns, in particular a maximum of 20 ns.

According to an expedient embodiment the individual pulses are set such that they have a pulse width in a range between 80 ns and 120 ns and preferably in a range between 90 ns and 110 ns.

The described edge steepness and the described pulse width have proved to be suitable for generating the electron transports within the semiconductor material of the radiation detector.

At least one embodiment is directed to a radiation detector.

In at least one embodiment, the radiation detector, in particular X-ray detector, described in the introduction has a control device for an illumination unit, in particular for an LED unit. The control device has a pulse current source and a DC source.

Thanks to the embodiment of the control device with the division into the pulse current source and the DC source a simple and inexpensive structure is achieved.

The pulse current source and the DC source are furthermore connected in parallel to one another. The parallel connection is based on the consideration that in this way account is taken of a superimposition of both the signals.

The pulse current source expediently has a first switching element and a second switching element serially following on from the first switching element. The first switching element is used to set the amplitude (pulse height) of the pulsed signal portion and the second switching element is used to set the pulse pattern of the pulsed signal portion.

For this the first switching element preferably has an electronic load—also called a current sink—and the second switching element preferably has a switch.

Electronic loads are electrical engineering components or assemblies of components which are normally arranged in a circuit as a replacement for a load resistor. The difference between an electronic load and for example a (conventional) ohmic resistor can be seen in the adjustability of the electronic load. In other words: whereas an electrical current flows via an ohmic resistor connected to a voltage source and has a constant value, the electrical current which flows via an electronic load can be adjusted within a defined value range, for example via an electronic controller.

Electronic loads moreover preferably have electronic switches, in particular transistors, to enable the electrical current to be adjusted.

Both the electronic load of the first switching element and the switch of the second switching element preferably have an electronic switch, in particular a transistor.

One difference between the electronic switches arranged in the switching elements consists in the switching time which the electronic switches have. The switching time is directly correlated to a transition frequency which describes the switching frequency of a transistor. To set the pulse height of the pulsed signal portion the first switching element has an electronic switch, in particular a transistor, which preferably has a transition frequency with a value in the range between 100 MHz and 200 MHz. This—for electronic switches—slow switching frequency is based on the consideration that to set the pulse height of the pulsed signal portion, in particular taking into account the aspect that the pulse height is preferably raised in a step-shaped manner, a switching frequency in the specified value range satisfies the requirements.

The second switching element expediently has an electronic switch, in particular a transistor, which has a transition frequency with a value in the range between 500 MHz and 2 GHz, in particular with a value in the range between 1 GHz and 1.5 GHz. In general terms, the second switching element for example has a switching frequency that is higher at least by a factor of 5, preferably by a factor of 10, than a required switching frequency which is calculated from a required edge steepness. Thus the second switching element is designed to set the pulse pattern, which preferably has an edge steepness with a value in the range between 10 ns and 20 ns.

The advantage is that because of the divided generation of the pulsed signal portion it is possible to use inexpensive components, in particular for the components of the first switching element, as a result of which the control device nevertheless satisfies the same requirements as the conventional expensive control devices.

The DC source preferably has a third switching element to set the direct component in which preferably an electronic switch, in particular a transistor, is arranged, which has a transition frequency with a value in the range between 100 MHz and 200 MHz. Because of the permanent illumination of the semiconductor material the advantage of this embodiment in contrast to a fast switching time can be seen in the inexpensive manufacture of the switching element by virtue of simpler components. Furthermore, the electronic switches of the first switching element and of the third switching element preferably have the same components.

FIG. 1 illustrates a simplified circuit diagram of an embodiment variant of a control device 2 for an illumination unit 4, in particular an LED unit 6. The illumination unit 4 serves to illuminate a radiation detector 5. The radiation detector 5 is an X-ray radiation detector described in the introduction.

"LED unit 6" here means an arrangement of multiple individual LEDs in the manner of an array. Furthermore, the illumination unit 4 has a supply unit 8 to supply the LED unit 6 and the control device 2 with a supply voltage. The control device 2 and the illumination unit 4 are electrically connected to one another via a cable 10. The LED unit 6 has conventional LEDs or alternatively infrared LEDs.

The control device 2 and the illumination unit 4 are designed to illuminate a semiconductor material of a radiation detector, in particular an X-ray radiation detector. With the help of the illumination it is possible to determine a polarization status of the radiation detector.

To illuminate the semiconductor material a control signal SA which is generated via the control device 2 is applied to the LED unit 6.

To this end the control device 2 in the example embodiment has a pulse current source 12 and a DC source 14.

The control signal SA thus has two signal portions, a pulsed signal portion SP and a direct component SG, which are added together in a node point 16 of the control device to generate the actual control signal SA.

The pulse current source 12 is designed to generate the pulsed signal portion SP. To this end the pulse current source 12 has a first switching element 18a and a second switching element 18b serially following on from the first switching element 18a.

To set a pulse height of the pulsed signal SG the first switching element 18a has a first electronic load 20a. The first electronic load 20a has a first electronic switch 22a, in the example embodiment a transistor, for example a transistor of type BC817. Furthermore, to control the first electronic switch 22a the first electronic load 20a has a first control unit 24a, in the example embodiment a digital-analog converter.

To set a pulse pattern of the pulsed signal SG the second switching element 18b has a switch 21. The switch 21 in particular has a second electronic switch 22b, in the example embodiment a transistor, for example a transistor of type BFU590G. Furthermore, the second switching element 18b has a second control element, in the example embodiment a field programmable gate array (FPGA), connected to the second electronic switch 22b, to control and set the pulse pattern.

Differences between the two switching elements 18a, b can essentially be seen in different requirements in respect of the switching times, in particular the transition frequencies of both the electronic switches 22a, b.

A requirement for the switching time of the second electronic switch 22b emerges from a requirement for a maximum permissible edge steepness of a pulse pattern to be set. In the example embodiment the pulsed signal portion has a pulse pattern in the manner of a square-wave signal.

The second electronic switch 22b preferably has a transition frequency with a value in the range between 500 MHz and 2 GHz, in particular with a value in the range between 1 GHz and 1.5 GHz. With transition frequencies with a value within the stated ranges, edge steepnesses with a value in the range between 10 ns and 20 ns can be achieved.

Higher transition frequencies are also conceivable, for example in the example embodiment the second electronic switch 22b has a transistor of type BFU590G, which has a transition frequency of 8.5 GHz.

According to the embodiment, preferred in the example embodiment, of the rise in the pulse height (amplitude) of the individual pulses of the pulsed signal portion SG the rise takes place in a step-shaped manner. Thus a switching time, or respectively a transition frequency of the first electronic switch 22a, arises which has a lower value than the value of the transition frequency of the second electronic switch 22b. The basis of this consideration is that to achieve the stepped shape after just one pulse sequence, which corresponds to a multiple of an individual pulse duration, the pulse height (amplitude) of the individual pulses is increased. In the example embodiment the transition frequency of the first electronic switch 22a of type BC817 has a value of 170 MHz.

A transition frequency of an electronic switch typically has a value higher by a factor of 10 than a value of a desired edge steepness which is converted into a frequency and which is to be achieved via the electronic switch. For example, to achieve an edge steepness of 10 ns, which corresponds to a frequency of 100 MHz, an electronic switch has a transition frequency of 1 GHz.

The DC source 14 is designed to generate the direct component SG. To this end the DC source 14 has a third switching element 18c. To set the direct component SG the third switching element 18c firstly has a third control unit 24c, for example a digital-analog converter, and secondly a current sink 20b. The current sink 20b has a third electronic switch 22c, for example a transistor of type BC817. Furthermore, the third switching element 18c has an operation amplifier 26 for the analog control of the direct component SG. The setting, for example of an amplitude of the direct component SG which is connectably fed to the pulsed signal portion SG via the third electronic switch 22c, is made via the third control unit 24c.

Typically and preferably the direct component SG permanently acts on the LED unit 6 during operation. For the third electronic switch 22c this thus produces requirements in respect of a switching time and/or a transition frequency which are preferably satisfied via a conventional transistor, for example a bipolar transistor of type BC817.

Additionally the pulsed current source has a current limiting element 28, for example an emitter resistor, to compensate for a temperature drift of the first electronic switch 22a. In general terms "temperature drift" means a temperature-dependent current amplification of the transistor.

Furthermore, the DC source has a current measurement element 29, for example a shunt resistor, to detect a height of the direct component SG.

For better understanding the method already described in DE 10 2015 201 494 A1 is looked at briefly once again below:

The pulsed signal portion acts upon the LEDs. Because of the increase in the amplitude of the individual pulses and thus an increase in the LED current which flows through the LEDs, the light of the LEDs has an increasing intensity. Thanks to the increasing intensity of the light of the LEDs an increasing number of charge carrier pairs is generated within a semiconductor material of the radiation detector 5, resulting in a higher charge pulse. After each increase in the amplitude of the individual pulses and thus after each increase in the charge pulse, this is compared with a preset threshold voltage of a signal detection unit. If for example the charge pulse has a smaller value than the threshold voltage, a counting event is for example detected within the signal detection unit and the amplitude of the individual pulses is increased via the control device 2. Following the increase, the charge pulse is once again compared with the threshold voltage. If for example the value of the charge pulse exceeds the value of the threshold voltage, the counting event is used as a value to assess the polarization of the radiation detector. "Counting event" refers to how often an increase in the individual pulses took place, until the value of the charge pulse has exceeded the value of the threshold voltage.

Because of the change over time in the polarization and because of the influence of radiation on the polarization status of the radiation detector the method to determine the polarization is preferably performed once prior to a treatment of a patient and once after a treatment of the patient. For both measurements an identical value for the threshold voltage is set in each case. For example, in the case of the measurement after the treatment and thus after the radiation detector was exposed to X-ray radiation a faster or slower exceedance of the threshold voltage can be established. The difference between a number of individual pulse increases until the threshold voltage is exceeded in the case of the measurement prior to the treatment and a number of individual pulse increases until the threshold voltage is exceeded in the case of the measurement after the treatment is interpreted as signal drift and is then for example reduced via calibration methods.

Figure 2:
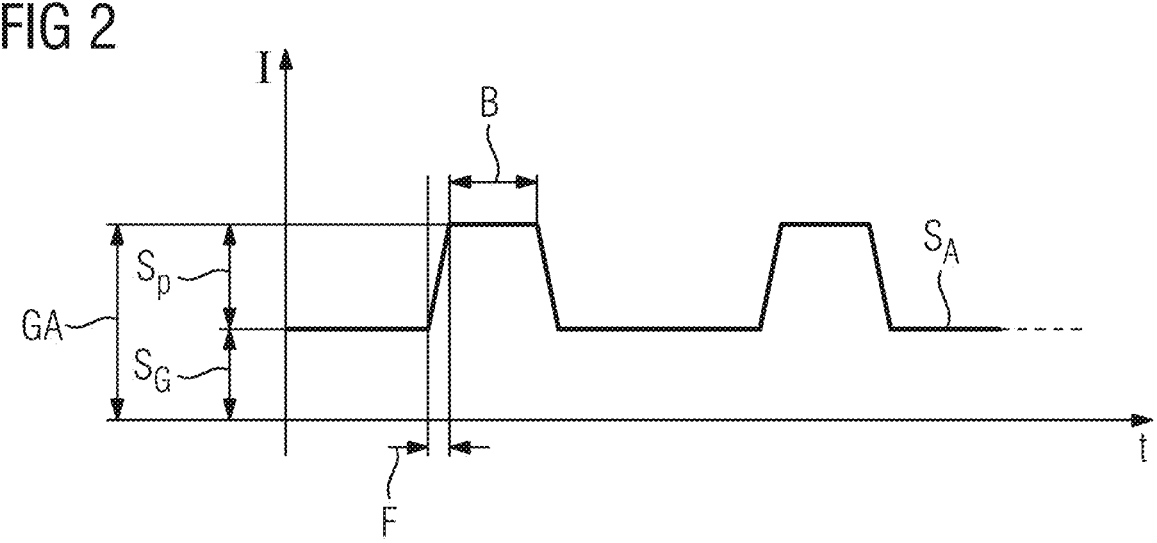
FIG. 2 shows a schematic partial representation of a control signal of an embodiment.

FIG. 2 shows a schematic partial representation of a control signal SA. In this case the value I of the control signal is plotted on a vertical current axis as a function of the time t plotted on a horizontal time axis. In the example embodiment the control signal SA has a pulsed signal portion SP in the manner of a square-wave signal. Furthermore, the pulsed signal portion SP is superimposed with a direct component SG. The superimposition of the pulsed signal portion SP "shifts" the pulsed signal portion SP in the direction of the current axis by the value of the direct component SG. The control signal SA thus has an overall amplitude GA. The overall amplitude GA is formed from the sum of the value of the direct component SG and the amplitude (pulse height) of the pulsed signal portion SP.

In the example embodiment the pulsed signal portion SP has an amplitude A, an edge steepness F and a pulse width B. The edge steepness F defines the time in which the pulsed signal portion SP rises from an initial value (in the example embodiment the initial value is the value of the direct component SG) to the full value of its amplitude A. In the example embodiment the edge steepness F in particular has a maximum value of 20 ns. The pulse width B defines a time in which the control signal SA, or the pulsed signal portion SP respectively, has its amplitude before the pulsed signal portion SP decreases to its initial value for the formation of the pulse pattern. In the example embodiment the pulse width has a value in the range between 100 ns and 120 ns.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a radiation detector, upon being illuminated with light via an illumination unit, the illumination unit being controllable via a control device including a DC source and a pulse current source, the method comprising:
   controlling the illumination unit by a control signal including a pulsed signal component and a direct component.

2. The method of claim 1, wherein the pulsed signal component has an amplitude and a pulse pattern and the pulse current source includes a first switching element and a second switching element following on from the first switching element, and wherein the amplitude is set via the first switching element and the pulse pattern is set via the second switching element.

3. The method of claim 1, wherein the pulsed signal component has a sequence of individual pulses, and wherein amplitude of the individual pulses increases.

4. The method of claim 1, wherein control of an amplitude of the pulsed signal component is dispensed with.

5. The method of claim 1, wherein the DC source includes a third switching element, and wherein the direct component is set via the third switching element.

6. The method of claim 1, wherein the direct component is configured to act upon the illumination unit for an entire duration of the controlling.

7. The method of claim 3, wherein the individual pulses have a maximum edge steepness of 20 ns.

8. The method of claim 3, wherein the individual pulses have a pulse width in a range between 80 ns and 120 ns.

9. A radiation detector comprising:
   a control device to control an illumination unit, the control device including
      a pulse current source, and
      a DC source, the pulse current source and the DC source being designed to control the illumination unit via a control signal including a pulsed signal component.

10. A method of claim 1, wherein the illumination unit is an LED unit and wherein the method includes controlling the LED unit by the control signal.

11. The method of claim 1, wherein the direct component is superimposed over the pulsed signal component.

12. The method of claim 10, wherein the direct component is superimposed over the pulsed signal component.

13. The method of claim 2, wherein the pulsed signal component has a sequence of individual pulses, and wherein amplitude of the individual pulses increases.

14. The method of claim 3, wherein control of an amplitude of the pulsed signal component is dispensed with.

15. The method of claim 2, wherein the DC source includes a third switching element, and wherein the direct component is set via the third switching element.

16. The method of claim 2, wherein the direct component is configured to act upon the illumination unit for an entire duration of the controlling.

17. The method of claim 8, wherein the individual pulses have a pulse width in a range between 90 ns and 110 ns.

18. The radiation detector of claim 9, wherein the DC source includes a third switching element to set a direct component of the control signal.

19. The radiation detector of claim 9, wherein the pulse current source includes a first switching element and a second switching element following on from the first switching element, and wherein the first switching element is designed to set an amplitude of the pulsed signal component and the second switching element is designed to set a pulse pattern of the pulsed signal component.

20. The radiation detector of claim 9, wherein
   the pulse current source includes a first switching element and a second switching element following on from the first switching element; and
   a transition frequency of the second switching element has a value greater than a value of a transition frequency determined from a required edge steepness.

21. The radiation detector of claim 9, wherein the illumination unit is an LED unit and wherein the control device is configured to control the LED unit via the control signal.

22. The radiation detector of claim 9, wherein a direct component of the control signal is superimposed over the pulsed signal component.

23. The radiation detector of claim 21, wherein a direct component of the control signal is superimposed over the pulsed signal component.

24. The radiation detector of claim 19, wherein a transition frequency of the second switching element has a value greater than a value of a transition frequency determined from a required edge steepness.

25. The radiation detector of claim 19, wherein a transition frequency of the second switching element has a value greater by a factor of 5 than the value of a transition frequency determined from a required edge steepness.

26. The radiation detector of claim 24, wherein the transition frequency of the second switching element has a value greater by a factor of 5 than the value of the transition frequency determined from the required edge steepness.

27. The radiation detector of claim 19, wherein the DC source includes a third switching element to set a direct component of the control signal.

\* \* \* \* \*